Dec. 15, 1931.  A. MOORHOUSE  1,836,932
HYDRAULIC SHOCK ABSORBER
Filed Dec. 19, 1928
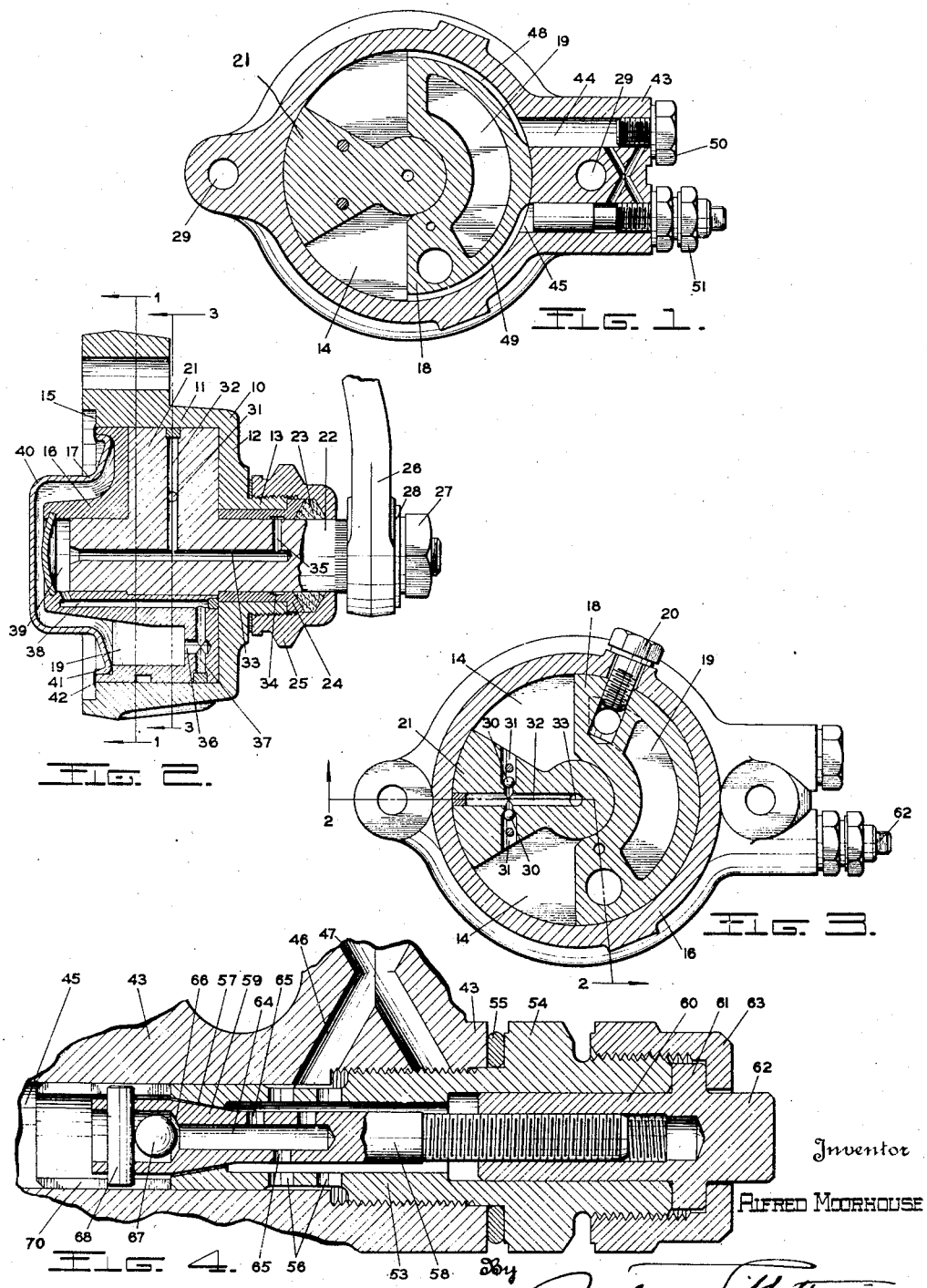
Inventor
Alfred Moorhouse
Attorney Patented Dec. 15, 1931

1,836,932

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

HYDRAULIC SHOCK ABSORBER

Application filed December 19, 1928. Serial No. 326,950.

This invention relates to hydraulic shock absorbers and more particularly to shock absorber metering devices for regulating the flow of liquid from one side of the piston to another in the working chamber.

The fluid generally used in such shock absorbers is oil or glycerine, the viscosity of which is changed by different temperatures, and therefore it becomes desirable to adjust the metering device to obtain a fluid flow which will maintain a uniform pressure condition in the working chamber. In addition to the above reason for an adjustable metering device, it is sometimes desirable, after installation, to regulate the fluid flow between opposite sides of the piston in shock absorbers to compensate for varied riding conditions. It is an object of this invention to provide a metering device for shock absorbers which can be readily adjusted to provide for the above specified conditions.

Another object of my invention is to provide a metering device, for hydraulic shock absorbers of the type restricting fluid flow more in one direction than in the other direction, which can be adjusted to increase or decrease the fluid flow similarly in both directions.

Other objects of the invention will appear from the following description taken in connection with the accompanying drawings which form a part of this specification, and in which:

Fig. 1 is a vertical sectional view of a shock absorber, taken on line 1—1 of Fig. 2, with which my invention is associated;

Fig. 2 is a sectional view of the same taken on line 2—2 of Fig. 3;

Fig. 3 is a vertical sectional view of the shock absorber taken on line 3—3 of Fig. 2, and Fig. 4 is a medial sectional view of the metering device associated with a fragmentary portion of the shock absorber.

Referring to the drawings, 10 is the body or casing of the shock absorber having a cylindrical portion 11, and end wall 12 and a bearing portion 13. The cylindrical portion and end wall form a fluid containing working chamber 14 for the shock absorber, and the cylindrical portion 11 is provided with an annular end portion 15 for a purpose presently to appear. An inner cover or closure 16 is inserted in the open end of the casing and is provided with an annular flange 17 adapted to be positioned contiguous to the end portion 15 of the casing. The cover or closure 16 has a semi-cylindrical extension 18 fitting into the cylindrical portion 11 of the casing, the extension being preferably cored out to form an auxiliary reservoir or reserve tank 19. A filling opening is provided by aligned passages in the casing and the extension 18, and is closed by a plug 20. Both the working chamber and reservoir are substantially filled with any suitable liquid such as oil, glycerine or a fluid having similar characteristics.

A vane piston 21, mounted to oscillate in the working chamber 14, has a shaft 22 suitably supported in the casing and cover. The packing 23 is compressed against the bearing sleeve 24 by a hollow nut 25 screwed on the bearing portion 13 of the casing. Outwardly of nut 25, shaft 22 is serrated and an arm 26 is mounted upon the serrated portion and held thereon by nut 27 and lock washer 28. The shock absorber is adapted to be mounted upon a suitable support by bolts extending through openings 29 in the casing. Arm 26 is adapted for connection in any suitable manner to a part which moves relative to the support upon which the absorber is mounted so that the piston will be operated in the working chamber as the vehicle parts move relative to each other. Piston 21 is provided with a pair of check valves 30 arranged in passages 31 which communicate with a passage 32 which in turn connects with a passage 33 in shaft 22. An annular leakage groove 34 is formed in bearing sleeve 24 and a short passage 35 connects this leakage groove with passage 33. Any liquid escaping from the working chamber in the direction of the bearing sleeve 24 will be caught in the leakage groove 34 and drawn back into the working chamber through passages 35, 33, 32 and 31, and past check valves 30 by reason of the suction existing on the receiving side of the piston. Liquid may be drawn into the working chamber from the lowermost part of the auxiliary reservoir 19, when needed, through connected passages 36, 37, 38, 39, 33, 32 and 31 and past check valves 30.

An outer cover in the form of a plate 40 having an annular flange 41 pressed into a cylindrical portion of the inner cover 16 formed by the annular flange 17 provides an enlargement of reservoir 19. As may be seen in Fig. 2 of the drawings, flange 41 of the outer cover and flange 17 of the inner cover are adapted to be positioned contiguously.

The flange ends 17 and 41 of the cover members are arranged to lie adjacent the edge portion 15 of the casing and are welded together as shown at 42 thereby providing an integral structure which is hermetically sealed at such joints. The packing 23, at the other end of the casing, also provides a seal so that the interior of the assembled casing is hermetically sealed.

The shock absorber casing is provided with a projecting boss 43 having spaced passages 44 and 45 arranged with their axes parallel and substantially normal to the axis of shaft 22. The passages 44 and 45 are connected near the outer end of the boss 43 by means of intersecting passages 46 and 47, and passage 44 is connected with the working chamber 14 of the shock absorber on one side of the piston by means of an arcuate groove 48 in the periphery of the cylindrical portion of the extension 18, and passage 45 is similarly connected with the working chamber on the opposite side of piston 21 by means of an arcuate groove 49 in the periphery of the extension 18. The outer end of the passage 44 is closed by a plug member 50, and a metering device 51 extends into and plugs the outer end of the passage 45.

The groove 48 and the casing adjacent thereto, the passage 44, the passages 46 and 47, the passage 45 and the groove 49 provide duct means within the casing through which liquid can be moved from one portion of the working chamber to another on opposite sides of the piston. The oscillating piston 21 in moving toward either of the arcuate grooves 48 or 49 will compress the fluid within the chamber between it and the extension 18, forcing a portion of the fluid through the duct means and metering device into the fluid working chamber on the opposite side of the piston. The restriction of such flow of fluid determines the resistance relief to the piston movement, and obviously by regulating such flow varied riding conditions can be obtained.

In order to regulate the flow of liquid in the shock absorber from one side of the piston to the other, I provide a metering device which can be bodily inserted into operative position in the casing and also bodily removed, and which can also be adjusted from the exterior of the casing when installed. Further, the device is arranged with independent dual ducts, one of which can be adjusted to allow a similar varied flow in either direction, while the other duct will permit flow in only one direction. To receive the metering device, the outer end of the passage 45 is slightly enlarged and the outer portion of the interior wall is threaded. A hollow cylindrical casing 53, threaded externally, is screwed into the outer end of the passage 45 until a shoulder portion 54 compresses a gasket or packing 55 tightly against the end of the boss 43. The inner end of the casing fits closely into the passage 45 and is provided with a reduced intermediate portion provided with ducts 56 therethrough, such ducts being arranged in open communication with the passage 46. The inner end of the casing is provided with a conical opening providing a valve seat 57, while the opposite end extending exteriorly of the casing is open and threaded externally.

Valve mechanism is associated with the casing 53, and includes a rod 58 having a threaded bearing end, whereby adjustment can be made, and a conical valve head end 59. One end of the valve rod extends through the conical bore in the hollow casing and the other end screws into the adjustment and bearing member 60 which plugs the outer open end of the casing. The adjustment member is provided with a flange 61 which engages the outer end of the casing, while the portion 62 extending beyond the flange 61 is formed to provide faces for the engagement of a tool when adjustment of the valve is to be made. A nut 63 screws upon the threaded end of the casing and is formed to clamp the flange of the valve rod against the casing to prevent rotation thereof. The end of the casing 53, beyond the conical valve seat, is provided with diametric slots 70 for the reception of the pin 68 which extends through the valve rod so that by this arrangement the valve rod cannot rotate when the bearing member 60 is rotated to adjust the same axially. By screwing the adjustment member to the right or left, when the lock nut 63 is unscrewed, the valve rod will be moved axially so that the conical valve head will move toward or away from the seat 57 in the casing, and in this manner the restriction in the passage 45 can be regulated as desired. It will be understood that when this valve is set the same quantity of fluid can pass thereby in either direction.

The valve rod is utilized to provide a second duct means through which fluid can pass from the passage 46 to the open end of the passage 45, independently of the conical valve duct means. The end portion of the valve rod is formed with an axially extending passage 64 which terminates adjacent the ducts 56 in the casing and extends through the inner end thereof, such passage communicates with the portion of the casing open to the passage 46 through ducts 65. A valve seat 66 is formed interiorly of the valve rod, and a ball valve 67 is associated therewith. The pin 68 extending through the inner end of the valve rod permits only a limited movement of the ball valve. It will be seen that fluid can pass through the passage 64 to the passage 45, but there will be no flow of the fluid from the passage 45 through the passage 64 due to the ball seating, and thus there will be less resistance in the working chamber on the deflection movement of the piston than during rebound movement. Adjustment of the valve 59 will in no way alter the functioning of the one way duct means.

The various elements constituting the metering device, with the exception of the lock nut 63, are associated so that the resulting structure is a unit which can be bodily positioned in the absorber or detached therefrom. Pressure relief in the working chamber can be readily varied from the exterior of the absorber, so that different riding qualities can be provided for varying temperatures and driving conditions.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

What I claim is:

1. In a shock absorber, a casing forming a working chamber adapted to contain fluid, said casing having a passage therein establishing communication between different portions of the working chamber, and a metering device in the passage, said metering device including separated concentric ducts, a one way valve associated with one of the ducts and an exteriorly adjustable valve associated with the other duct.

2. In a shock absorber, a casing forming a working chamber adapted to contain fluid, said casing having a passage therein establishing communication between different portions of the working chamber, and a unitary removable metering device in the passage, said metering device including separated concentric duct means, means associated with one of the duct means to allow fluid to move in only one direction, and means associated with the other duct means to regulate the flow of fluid.

3. In a shock absorber, a casing forming a working chamber adapted to contain fluid, said casing having a passage therein establishing communication between different portions of the working chamber, and a unitary metering device in the casing passage, said metering device having a one way duct means therethrough and a separate adjustable duct means therethrough, said duct means being separated and concentrically disposed.

4. In a shock absorber, a casing forming a working chamber adapted to contain fluid, said casing having a passage therein establishing communication between different portions of said chamber, a removable plug in said passage having concentric ducts therethrough, a one way valve associated with one duct and an adjustable valve associated with the other duct.

5. In a metering device for shock absorbers having a passage through which fluid can flow in either direction, a hollow casing in the passage having a duct therethrough, an adjustable valve member extending axially through the duct, and a one way duct in said valve member.

6. In a metering device for shock absorbers having a passage through which fluid can flow in opposite directions, a hollow casing in the passage having a duct therethrough, an adjustable valve member extending axially through the duct in said casing, said valve member having an axially extending passage therethrough communicating with the duct in said casing, and a one way valve associated with the passage in said valve member.

7. In a metering device for shock absorbers having a passage through which fluid can flow in opposite directions, a hollow casing in the passage having a duct therethrough, a valve member extending through said casing cooperating to control the flow of fluid through the duct, means for adjusting said valve member relative to said casing, and means for locking said adjustment means.

8. In a metering device for shock absorbers having a passage through which fluid can flow in opposite directions, a hollow casing in the passage open at both ends and having a duct through a wall portion, a valve member extending through said casing and cooperating at one end with said casing to regulate the flow of fluid thereby, and rotatable means extending into said casing for adjusting said valve member axially.

9. In a metering device for shock absorbers having a passage through which fluid can flow in opposite directions, a hollow casing in the passage open at both ends and having a duct through a wall portion, a valve member extending through said casing and cooperating at one end with said casing to regulate the flow of fluid thereby, rotatable means extending into said casing for adjusting said valve member axially and means for clamping said adjusting means against said casing.

10. In a metering device for hydraulic shock absorbers having a passage through which fluid can flow in opposite directions, a hollow casing in the passage open at both ends and having a duct through an intermediate wall portion, a valve member extending through the hollow casing, said valve member having one end threaded, and the other end associated with an end of the casing to regulate the fluid flow thereby, an internally threaded adjusting member extending into an end of said hollow casing, said threaded end of the valve member being screwed into said adjusting member, and means for clamping said adjusting member against the end of said casing.

11. A metering device for hydraulic shock absorbers comprising a hollow housing open at both ends, said housing having a passage through an intermediate wall portion, a valve member cooperating with the inner open end of said housing, lock means for closing the outer end of said housing, said lock means being adapted to control the position of said valve member relative to the associated open end of said housing, said valve member having a passage communicating with the passage in said housing and extending past the inner end of the housing, and a one way valve associated with the passage in said valve member.

12. A metering device for hydraulic shock absorbers comprising a hollow housing closed at one end and having a conical valve seat at the other end, said housing having a passage through an intermediate wall portion, a conical valve member associated with the valve seat in said housing, said valve member having a passage therein communicating with the hollow casing and extending beyond the valve seat end thereof, means for adjusting the position of said valve member relative to the valve seat, and a one way valve in the passage in said valve member.

In testimony whereof I affix my signature.

ALFRED MOORHOUSE.